US008155382B2

(12) United States Patent
Rubenstein

(10) Patent No.: US 8,155,382 B2
(45) Date of Patent: Apr. 10, 2012

(54) IMAGE ANALYSIS BY OBJECT ADDITION AND RECOVERY

(75) Inventor: Eric P. Rubenstein, East Hartford, CT (US)

(73) Assignee: Advanced Fuel Research, Inc., East Hartford, CT (US)

( * ) Notice: Subject to any disclaimer, the term of this patent is extended or adjusted under 35 U.S.C. 154(b) by 0 days.

(21) Appl. No.: 13/074,465

(22) Filed: Mar. 29, 2011

(65) Prior Publication Data

US 2011/0176707 A1 Jul. 21, 2011

Related U.S. Application Data

(63) Continuation of application No. 11/852,614, filed on Sep. 10, 2007, now Pat. No. 7,940,959.

(60) Provisional application No. 60/825,017, filed on Sep. 8, 2006.

(51) Int. Cl.
*G06K 9/00* (2006.01)
*H04N 7/18* (2006.01)

(52) U.S. Cl. ......................... 382/103; 382/275; 348/143

(58) Field of Classification Search .................. 382/100, 382/103, 107, 155, 168, 181, 199, 203, 224, 382/232, 254, 274, 276, 286–291, 305, 312; 700/83, 94; 348/155, 143, 349; 715/716
See application file for complete search history.

(56) References Cited

U.S. PATENT DOCUMENTS

| 6,400,996 | B1 * | 6/2002 | Hoffberg et al. | 700/83 |
| 6,850,252 | B1 * | 2/2005 | Hoffberg | 715/716 |
| 7,705,908 | B2 * | 4/2010 | Fredlund et al. | 348/349 |
| 7,813,822 | B1 * | 10/2010 | Hoffberg | 700/94 |
| 2005/0073585 | A1 * | 4/2005 | Ettinger et al. | 348/155 |
| 2005/0104958 | A1 * | 5/2005 | Egnal et al. | 348/143 |

OTHER PUBLICATIONS

Zhang et al., Segmentation of Moving Objects in Image Sequence: A Review, Systems and Signal Processing, Mar. 2001, 20(2):143-183.

* cited by examiner

*Primary Examiner* — Seyed Azarian
(74) *Attorney, Agent, or Firm* — Pepper Hamilton LLP

(57) ABSTRACT

The invention described herein is generally directed to methods for analyzing an image. In particular, crowded field images may be analyzed for unidentified, unobserved objects based on an iterative analysis of modified images including artificial objects or removed real objects. The results can provide an estimate of the completeness of analysis of the image, an estimate of the number of objects that are unobserved in the image, and an assessment of the quality of other similar images.

22 Claims, 9 Drawing Sheets

IMAGE ANALYSIS BY OBJECT ADDITION AND RECOVERY

CROSS-REFERENCE TO RELATED APPLICATIONS

This application is a continuation of and claims priority to U.S. patent application Ser. No. 11/852,614, filed Sep. 10, 2007, which issued as U.S. Pat. No. 7,940,959, on May 10, 2011, which claims priority to and benefit of U.S. Provisional Application No. 60/825,017 entitled "Classification and Assessment Modeling by Simulated Target Addition and Recovery" filed on Sep. 8, 2006; the entire contents of each of which are hereby incorporated by reference in their entireties.

GOVERNMENT INTERESTS

The United States Government may have certain rights to this invention pursuant to work funded thereby under grants from the National Science Foundation (NSF) Small Business Technology Transfer Program (STTR) Contract No.: DMI-0441639, Topic IT.c9 "Information-based Technologies".

PARTIES TO A JOINT RESEARCH AGREEMENT

Not applicable

INCORPORATION BY REFERENCE OF MATERIAL SUBMITTED ON A COMPACT DISC

Not applicable

BACKGROUND

1. Field of Invention

The invention presented herein provides methods for analyzing images.

2. Description of Related Art

The outstanding characteristics of modern light detectors have made it possible to retrieve high quality images from a wide variety of platforms. However, their high-fidelity nature does not help in disentangling the images of objects blended together in crowded fields, those that are partially obscured or barely visible in the noise of low signal-to-noise (SNR) data, or adversarial efforts to purposefully deceive image detectors. Although certain indicators of quality are readily apparent, such as pixilated objects that are unresolved, obvious blurriness, or uncertainty in visual characteristics due to low SNR, obtaining a realistic understanding of the limitations of image data is often extremely difficult. Failing to detect an object does not provide enough data to be certain that the object is not actually present.

One approach to analyzing crowded fields in astronomy is artificial star analysis. In this approach, a light pattern appropriate for a star of a given brightness, color and location in the sky is added to the digitized image data of a real star field. The modified data are then analyzed in the usual way, and the parameters derived from the artificial star are compared to the known input parameters. This process is then repeated thousands of times for stars with randomly chosen characteristics. The deviations between the output of the analysis program and the known characteristics of the artificial stars are then used to evaluate the relation between the results for the real stars and the true underlying stellar populations in the field.

There are several limitations inherent in this method. The physics of target/background interaction in terrestrial images is more complex than artificial star insertion into an astronomical image because terrestrial objects are typically more complex than stellar profiles and because terrestrial backgrounds are considerably more complex than the relatively smooth background of space. Additionally, only a few artificial stars may be added to the image data at any one time, otherwise the artificial stars themselves significantly change the crowding of the field and the results become unreliable. Thus, a full data set (plus artificial stars) must be analyzed many, potentially thousands of times using, for example, Monte Carlo simulation, to obtain a large statistical sample of artificial stars. Conceptually, the artificial star population must be comparable to the population of real stars, otherwise biases will be introduced. However, the population of real stars is not known in advance, so ensuring that the artificial stars are truly comparable to real stars requires considerable ingenuity. Additionally, there are a variety of problems of detail, such as the best way to characterize the light distribution that would be created by an individual star. Moreover, determining the validity of each round of artificial star analysis is labor intensive and time consuming. Historically, each new round of artificial star analysis was preceded by an astronomer evaluating the previously acquired data set to determine if the resulting implied confidence-level was achieved. The astronomer would then decide whether additional Monte Carlo simulations were necessary.

Benefits of artificial star analysis include determination of detection probabilities across a range of observing conditions (light-level, background/foreground image structure, high-noise, etc.).

BRIEF SUMMARY OF THE INVENTION

Embodiments of the invention described herein include a method for detecting an object in an image, the method including the steps of: obtaining one or more real images; analyzing the one or more real images and deriving a set of parameters defining each of the one or more real images; creating a modified image; analyzing the modified image to derive a set of parameters defining the modified image; comparing the set of parameters derived from the modified image with the set of parameters derived from the one or more real images; determining the likelihood of additional objects being present within the one or more real images; repeating the steps of creating, analyzing, comparing and determining; stopping the steps of creating, analyzing, comparing and determining when the probability of additional, unidentified objects being present in the one or more real images has met a predetermined level; and generating a report describing compiled results of repeating the steps of inserting, analyzing, comparing and determining.

In various embodiments, the step of creating a modified image may include inserting at least one artificial object into at least one of the one or more real images or removing at least one object in at least one of the one or more real images, and in some embodiments, creating a modified image may include a combination of inserting and removing objects in the real image The one or more real images used in the method may vary among embodiments and may include digital images, analog images and a combination thereof obtained from aerial still images, aerial video images, satellite still images, satellite video images, ground to ground still images, ground to ground video images, ground to air still images, ground to air video images, ground to water still images, ground to water video images, water to ground still images, water to ground video images, water to water still images, water to water video images, air to air still images, air to air video images or a combination thereof. The area encompassed by the one or more image may also vary among embodiments and may include a terrestrial area, an aquatic area, an aerial area, an extraterrestrial area or a combination thereof.

The step of analyzing may be carried out using any process known in the art, and in some embodiments, the step of analyzing the one or more real images and the step of analyzing the modified image are carried out using the same process. In various embodiments, the step of analyzing the one or more real image, the modified image or a combination thereof and deriving a set of parameters may further include determining a data value for parameters, such as, for example, a number of objects, brightness, contrast, color, shape, orientation, location and a combination thereof.

In various embodiments, the step of analyzing may further include digitizing the one or more real images, digitizing the modified image or combinations thereof. In certain embodiments, the step of analyzing further include creating a plurality of image chips, each of the plurality of image chips having a portion of the one or more real images or modified images and the step of analyzing may include parsing the plurality of image chips at least into one or more groups of image chips having objects and one or more groups of image chips not having objects.

In various embodiments, the steps of obtaining, inserting, analyzing or a combination thereof may further include enhancing at least a portion of the one or more real images or modified image by a method including, but not limited to, adjusting contrast, adjusting color, image extraction, collaging, registering, coadding, averaging, median-filter combining, sigma-clip averaging, splicing, histogram matching, mosaicking, convolution filtering, deconvolution filtering, unsharp-masking, edge detection, Fourier transformation, reducing background noise, texture processing and a combination thereof.

In some embodiments, the method may further include identifying at least a portion of an object in the real image, and the step of identifying at least a portion of an object may further include determining a total number of objects in an image or a portion of an image. In other embodiments, the step of identifying objects may further include comparing the identified object to known objects to identify a type of object. The step of identifying an object may occur at any point in the method, however, in certain embodiments, the step of identifying objects may occur concurrently with or following the step of analyzing.

In various embodiments, at least one artificial object added to an image may include at least a portion of an object identified in the one or more real images, at least a portion of a known object, at least a portion of an archived object or a combination thereof. In other embodiments, the at least a portion of the at least one artificial object may include a set of parameters selected from brightness, contrast, color, shape, orientation, location and a combination thereof, wherein all or a subset of parameters are the same as a derived set of parameters defining at least a portion of the one or more real image.

In some embodiments, the step of inserting at least one artificial object may include rotating, scaling, shearing, smearing, rotating, convoluting, degrading or a combination thereof of the at least one artificial object such that the at least one artificial object is consistent within the context of the image, and in other embodiments, the step of inserting at least one artificial object further comprises modifying the at least one artificial object using a method such as, but not limited to, adding shadows, adding one or more obscuration, adding a layover, performing a multipath, adding indirect illuminations, adding reduced/partial transparency effect, simulating camouflage, simulating netting, simulating vegetation, simulating ground covering, simulating water covering, simulating cloud covering, simulating weather, convolving with a nearby object and a combination thereof.

In some embodiments, the method may include recovering an optical characteristic from the at least one modified image wherein the optical characteristic comprises a property of an object selected from brightness, color, location, orientation, reflectivity, a probability of recovering an optical characteristic, an uncertainty for the optical characteristic recovered and a combination thereof. In particular embodiments, the method may include the step of applying the recovered optical characteristic to one or more objects of the one or more real images, applying the recovered optical characteristic to one or more archived object in a library, applying the recovered optical characteristic to one or more real or modified images being analyzed, applying the recovered optical characteristic to one or more real or modified images that are subsequently analyzed, or a combination thereof.

In various embodiments, the identified object, artificial object or combination thereof may be a human, an animal, a building, a machine, a geological formation, a type of plant, an aquatic feature, an aerial feature, an airplane or airplanes, an extraterrestrial feature, a vehicle, a military implement, an artillery installation, a tank and a combination thereof.

The method of some embodiments may also include the step of determining a confidence level for the one or more real images wherein the confidence level is the probability of a number of objects in the one or more original images being identified.

In various embodiments, the method may be automated.

Various embodiments, may also encompass a method for detecting an object in an image including obtaining one or more real images; analyzing the one or more real images and deriving a set of parameters defining each of the one or more real images; inserting at least one artificial object into at least one of the one or more real images to create a modified image; analyzing the modified image to derive a set of parameters defining the modified image; comparing the set of parameters derived from the modified image with the set of parameters derived from the one or more real images; determining the likelihood of additional objects being present within the one or more real images; repeating the steps of inserting, analyzing, comparing and determining; stopping the steps of inserting, analyzing, comparing and determining when the probability of additional, unidentified objects being present in the one or more real images has met a predetermined level; and generating a report describing compiled results of repeating the steps of inserting, analyzing, comparing and determining.

Various other embodiments of the method described herein for detecting an object in an image may include obtaining one or more real images; analyzing the one or more real images and deriving a set of parameters defining each of the one or more real images; removing at least one object in at least one of the one or more real images to create a modified image; analyzing the modified image to derive a set of parameters defining the modified image; comparing the set of parameters derived from the modified image with the set of parameters derived from the one or more real images; determining the likelihood of additional objects being present within the one or more real images; repeating the steps of removing, analyzing, comparing and determining; stopping the steps of removing, analyzing, comparing and determining when the probability of additional, unidentified objects being present in the one or more real images has met a predetermined level; and generating a report describing compiled results of repeating the steps of inserting, analyzing, comparing and determining.

Still other embodiments of the invention may be directed to a system including at least one detector for acquiring at least one real image; a processor configured to analyze images and generate a set parameters in communication with the at least one detector; a processor configured to create at least one modified image by inserting at least one artificial object into the at least one real image or removing at least one object from at least one of real image in communication with the processor for analyzing images; a processor configured to compare one or more sets of parameters generated for the at least one real image and one or more sets of parameters generated for at least one modified image in communication with the processor for analyzing images; a processor configured to determine whether enough modified images have been created in communication with the processor for comparing sets of parameters and the processor for creating modified images; and an output device.

In yet other embodiments, the invention described herein encompasses a information storage device comprising an algorithm in computer readable form for analyzing the one or more real images and generating a set of parameters defining the one or more real images; creating a modified image by inserting or removing objects in the real image; analyzing the modified image and generating a set of parameters defining the one or more modified images; comparing the parameters defining the modified image with the parameters defining the one or more real images; determining the probability of at least one additional object being present in the image; determining the uncertainty in at least one parameter; repeating the steps of inserting, analyzing, comparing and determining; and stopping the steps of inserting, analyzing and comparing when it is determined that the probability of at least one additional object being present at one or more locations on the one or more real images, and/or the uncertainty in the at least one parameter has reached a threshold confidence level.

DESCRIPTION OF DRAWINGS

For a fuller understanding of the nature and advantages of the present invention, reference should be made to the following detailed description taken in connection with the accompanying drawings, in which.

DETAILED DESCRIPTION

It must be noted that, as used herein, and in the appended claims, the singular forms "a", "an" and "the" include plural reference unless the context clearly dictates otherwise. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications and references mentioned herein are incorporated by reference. Nothing herein is to be construed as an admission that the invention is not entitled to antedate such disclosure by virtue of prior invention.

As used herein, the term "about" means plus or minus 10% of the numerical value of the number with which it is being used. Therefore, about 50% means in the range of 45%-55%.

"Optional" or "optionally" may be taken to mean that the subsequently described structure, event or circumstance may or may not occur, and that the description includes instances where the event occurs and instances where it does not.

The invention described herein is generally directed to a method for identifying one or more objects in an image, a method for assessing the probability of one or more unidentified objects being present in the image and a method for assessing the quality of analysis of an image.

Figure 1:
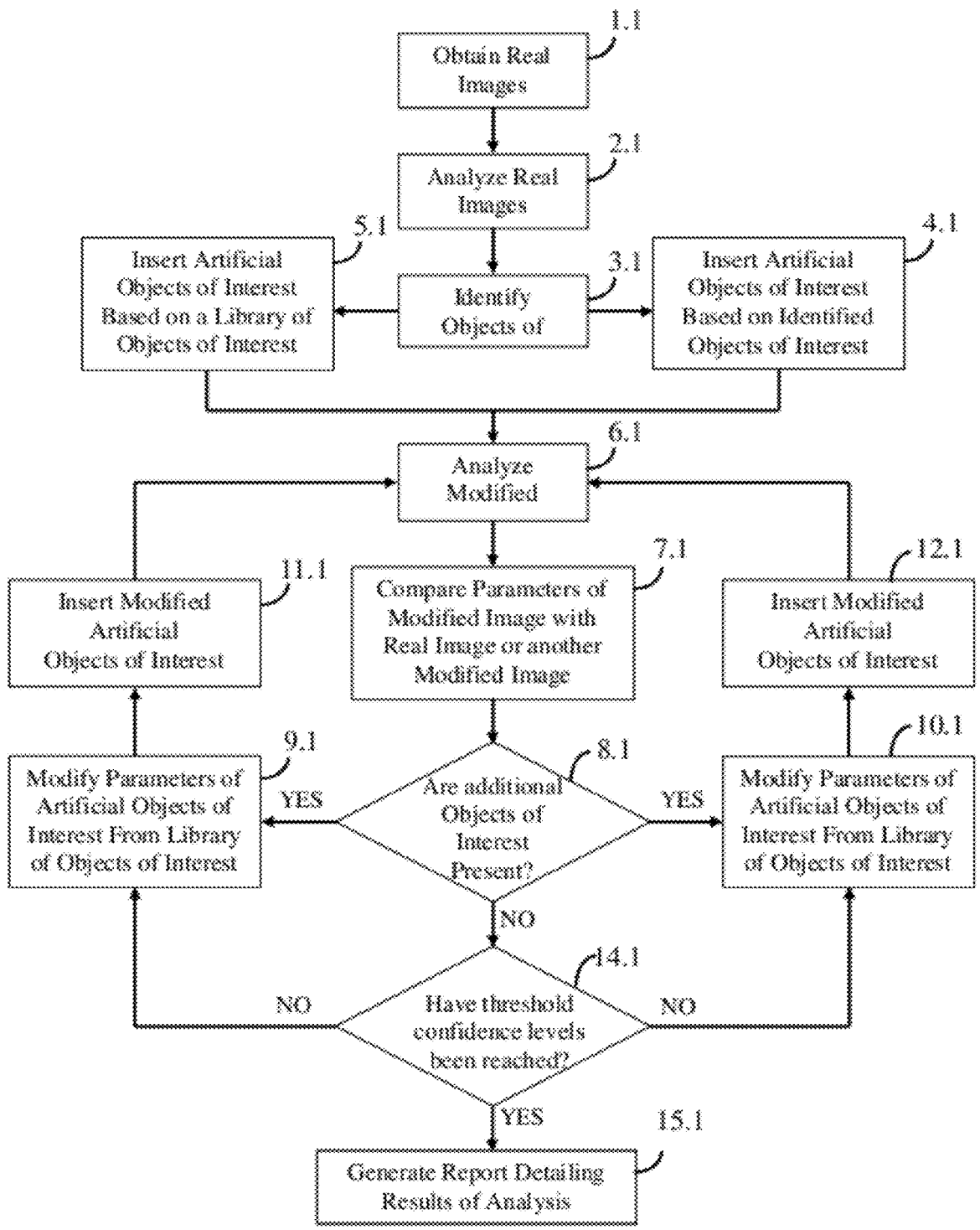
FIG. 1 is a flow chart illustrating one embodiment of the method of the invention in which one or more artificial images are added to an image.

In various embodiments of the invention, methods for identifying objects in an image and/or assessing the probability of the presence of an unidentified object in the image may be performed using, for example, iterative Monte Carlo-type simulation techniques. For example, FIG. 1 is a flow chart describing one embodiment of the method of the invention including the steps of obtaining one or more real images (1.1), analyzing the real image (2.1) and identifying objects present in the real image (3.1). At least one artificial object may be inserted into the real image to create a modified image (4.1 and 5.1). In some embodiments, the at least one artificial object may be an artificial object based on objects identified in the one or more real images (4.1), and in others, the at least one artificial object may be acquired from a library of objects (5.1). The modified image may than be analyzed (6.1) and various parameters derived from the modified image may be compared with the parameters determined from the real image (7.1). A user or a predetermined set of parameters may than be used to determine the likelihood of additional objects being present in the image (8.1). If there is a probability of additional, unidentified objects being present in the image, one or more parameters of the artificial object may be altered or adjusted (10.1 and 9.1). As in the previous steps, the artificial image whose parameters are altered may be based on the object from the real image (10.1) or acquired from a library (9.1). The modified artificial object may then be reinserted into the image to create a second modified image (12.1 and 11.1). The second modified image may be analyzed using the same method as in step 6.1 or a different method for analyzing the artificial image may be used. The parameters of the second modified image may then be compared to the real image or the first modified image as in step 7.1. Differences in one or more parameters caused by the artificial objects of the modified image may then be identified and their effect on the accuracy of the real image may be determined as in step 8.1. For example, the addition of an artificial object may cause various parameters in a portion of the real image containing an as to yet unidentified object to be altered such that the unidentified object becomes apparent. If additional objects may still be present steps 10.1, 12.1, 6.1, 7.1 and 8.1 and/or steps 9.1, 11.1, 6.1, 7.1 and 8.1 may be repeated any number of times until it can be determined that the likelihood of additional unidentified objects being in the real image is sufficiently low.

Real and artificial objects may be any object that may be usefully identified using the methods of the invention and that may be present in an image, including, but not limited to, a human; an animal; a plant; a building; a machine; a vehicle, such as, an automobile, a truck, a tank, a boat, a ship, or an armored personnel carrier; a military implement; an ammunition dump; an artillery installation; an encampment; a bunker and any combinations of these or other objects. In some embodiments, the real or artificial object may not have a discernable shape, but rather may be a simple geometric shape having at least one optical characteristic in common with any of the objects identified. For example, all or a portion of an artificial object meant to represent a truck may be a square having a color, reflectivity, or brightness associated with a real truck.

In various other embodiments of the invention, one or more objects may be removed from the real image to create a modified image having fewer objects. For example, in one embodiment exemplified by the flow chart of FIG. 2, one or more real images may be acquired (1.2), analyzed (2.2) and objects in the real images may be identified (2.3), as in the previously described embodiment. Objects identified in the real images may then be removed (4.2) to create a modified image and the modified image may be reanalyzed (6.2). The parameters derived from the modified image may then be compared with the parameters of the real image (7.2) to determine the likelihood of additional objects being present in the one or more real images. Iterative analysis may then continue by adding artificial objects (9.2) as described above or removing additional objects (10.2) to create further modified images that can be reanalyzed (6.2) and whose parameters may be compared with the one or more real images and/or modified images (7.2). Analysis may continue until the likelihood of additional objects being present in the real image is sufficiently low (8.2), or until threshold confidence levels have been achieved (14.2). Without wishing to be bound by theory, the removal of real objects from an image may allow for the resolution of additional objects in the image to be discerned. For example, a portion of an object may be evident in an image but the total form of the object may be obscured by, for example, a building, vegetation, groundcover, a shadow or camouflage. By selectively removing a real object obscuring the hidden object, the hidden object may come more fully into view.

In still other embodiments of the method, iterative analysis is carried out using only real images. For example, as illustrated by the flow chart of FIG. 3, a first real image may be acquired (1.1.3), analyzed (2.1.3), and objects may be identified (3.1.3), and a second real image may be acquired (1.2.3), analyzed (2.2.3) and objects may be identified in the subsequent image. Alternatively or concurrently, a previously acquired image may be acquired (1.3.3), analyzed (2.3.3) and objects may be identified (3.3.3). The parameters determined for the first real image, the second real image and/or the previously acquired image, such as, for example, a satellite image acquired weeks, months or years before the first real image, may be compared (4.3) and the likelihood of unidentified objects in the first real image that may be obvious in the second real image or the previously acquires image may be determined (8.3). Additional images may be analyzed and compared in the same way by iteratively repeating steps 1.2.3, 2.2.3 and 3.2.3 and/or steps 1.3.3, 2.3.3, and 3.3.3 and 4.3. For example, in one embodiment, satellite images depicting an area may be acquired once per hour for several days to create a set of images which may be iteratively compared to one another to determine a confidence level that all of the objects in the images have been identified. In another embodiment, a current real image or a set of current real images may be compared to a stock image. In still another embodiment, the method of the invention may include iteratively comparing real images, as illustrated in FIG. 3, while concurrently inserting artificial images and/or removing objects, as illustrated in FIG. 1 and FIG. 2, from one or more of the real images or previous images.

As used herein, the term "iteration" may refer to any combination of steps in the method described above including creating a modified image, analyzing the modified image and comparing the modified image to the real image. Objects may be inserted or removed during any iteration of the methods described above. For example, in one embodiment, objects may be added in several iterations followed by one or more iterations where an object is removed from the real image. In another embodiment, several iterations including an object being removed may be carried out followed by several iterations including the addition of objects to the real image. In yet another embodiment, one or more iterations including the addition of an object may be carried out followed by several iterations including the removal of an object from the real image, followed by several more iterations including the addition of artificial objects. Iterations may proceed using any combination of iterations wherein artificial objects are added to the image and real objects and/or artificial objects are removed. In still another embodiment, artificial objects may be added to a real image and real and/or artificial objects may be removed in the same iteration.

Figure 2:
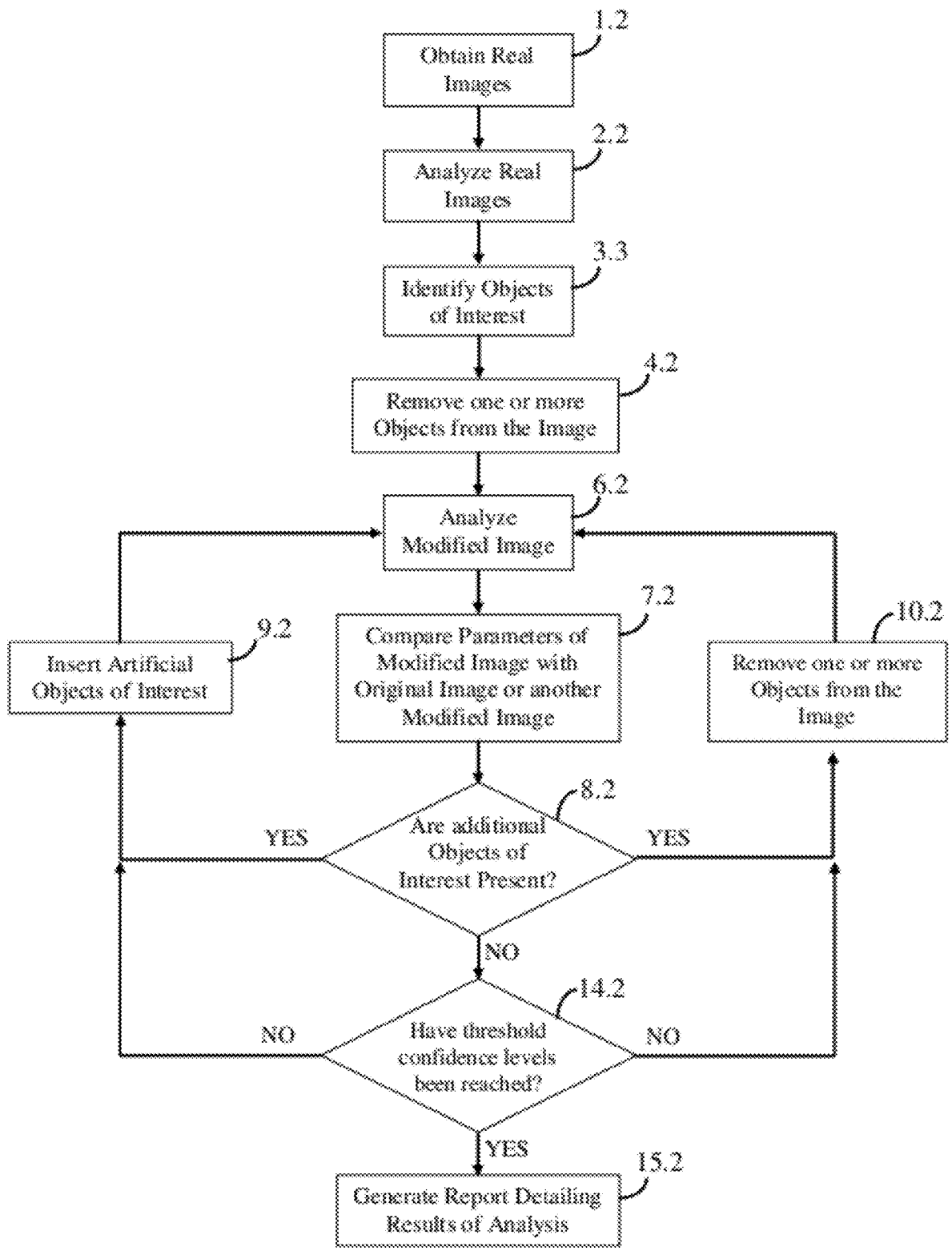
FIG. 2 is a flow chart illustrating one embodiment of the method of the invention including the removal of an object from an image.
Figure 3:
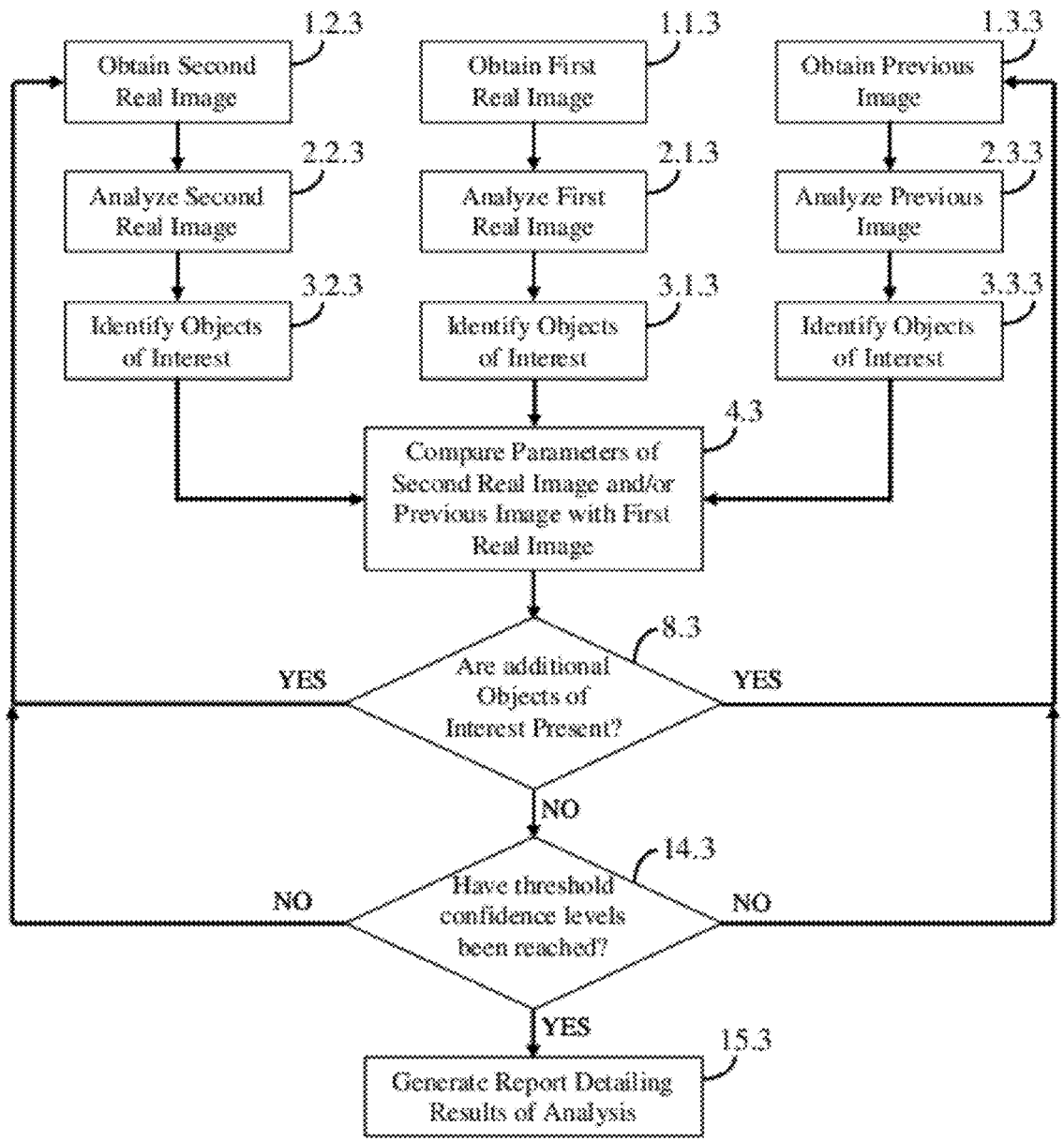
FIG. 3 is a flow chart illustrating one embodiment of the method of the invention including iterative comparisons of various acquired images.

In certain embodiments, predetermined threshold confidence levels may be used to determine the likelihood of additional, unidentified objects being in the real image (FIG. 1, 14.1, FIG. 2, 14.2 and FIG. 3, 14.3). In such embodiments, if threshold confidence levels have not been reached, steps 10.1, 12.1, 6.1, 7.1 and 8.1 and/or steps 9.1, 11.1, 6.1, 7.1 and 8.1 of FIG. 1, steps 10.2, 12.2, 6.2, 7.2 and 8.2 and/or steps 9.2, 11.2, 6.2, 7.2 and 8.2 of FIG. 2, and/or steps 1.2.3, 2.2.3, 3.2.3 and 4.3 and/or steps 1.3.3, 2.3.3, 3.3.3 and 4.3 of FIG. 3 may be repeated until the confidence level thresholds have been satisfied. Once it has been determined that there is a low likelihood of additional, unidentified objects being present in the real image or threshold confidence levels been reached, a report may be generated that details the analysis of the image (FIG. 1, 15.1, FIG. 2, 15.2 or FIG. 3, 15.3).

Hereinafter, a "known data set" shall be defined as a set of parameters including any number of data values describing a real image. An "unknown data set" shall be defined as a set of parameters describing a modified image and may be acquired by inserting or removing any number of objects into or out of a real image to create a modified image and reanalyzing the modified image to produce a set of parameters defining the modified image. In various embodiments of the invention, comparing a known data set and an unknown data set may be used to identify parameters that have altered as a result of the insertion of an artificial object or the removal of a real object from the image. Without wishing to be bound by theory, alterations in parameters may allow for the identification of areas within the real image where additional, unidentified objects may be present.

The known and unknown data set may contain data values for any number of parameters useful in various embodiments of the invention to define the real or modified image or a portion of the real or modified image. For example, in some embodiments, a known or unknown data set may include data values including a number of objects in the image, the brightness, contrast, color, shape, orientation or location of the identified objects or the brightness contrast, color and so on of any portion of the image that may or may not contain an object. During iterative analysis an unknown data set may be obtained by analyzing the modified image acquired in each step including the insertion of one or more artificial objects into an image or removal of one or more real objects from the image, and artificial objects may by inserted into a real or modified image at any number of positions in the image or objects may be removed from a real or modified image any number of times during iterative analysis to create a plurality of unknown data sets. Therefore, following iterative analysis a large number of data values may have been generated for each of the parameters describing the real image which may be compared and statistically analyzed using methods known in the art.

Without wishing to be bound by theory, the uncertainty associated with any number of the parameters identified may be determined by comparing a number of parameters determined for any number of real and/or modified images. Additionally, this uncertainty may be minimized by providing a greater number of measured values for each parameter which can be achieved by performing a greater number of iterations or by continuing iterative analysis. By minimizing the uncertainty associated with each parameter, the statistical error associated with each parameter may be reduced and/or minimized by performing iterative analysis, the completeness of analysis of the image may be quantified and the confidence level of these parameters may be ascertained. In short, over a number iterations, the error can be reduced and the likelihood of an object being present in that location may be ascertained. When the uncertainty of each parameter has been effectively minimized, the average of each parameter may be deduced to provide a "final data set" and the real image may be reevaluated using the final data set. Reevaluation may allow for objects which were not identified in the initial analysis of the image to come into greater resolution thereby allowing the previously unidentified object to be identified.

In another embodiment, Monte Carlo simulations may be used to systematically probe the real image throughout its field of view. For example, in one embodiment of the invention, a portion of an image may be identified during iterative analysis which has a high likelihood of containing a previously unidentified object. In such embodiments, this portion of the image may be isolated and iterative analysis may be carried out specifically on this portion of the image. For example, one or more objects may be inserted into the identified portion of the image while altering various parameters of the object, such as, the orientation, brightness, contrast, or color until the uncertainty of an object in this portion of image has been effectively minimized.

Careful interpretation of the differences between a known data set and an unknown data set may provide a wealth of information. For example, in one embodiment, iterative analysis may derive empirical uncertainties of target properties, including, but not limited to, optical characteristics such as, brightness, reflectivity and color of an object, location of the object, displacement/velocity of the object and so on and the probability of detection for a wide range of target parameters. The confidence levels generated by embodiments of the invention may provide a more accurate estimate of the number of actual observable objects that have been identified as well as an estimate of the number of objects that have been potentially missed. Moreover, embodiments of the invention may provide repeatable, quantitative measurements of the various properties of an image and their uncertainties.

In some embodiments, the method of the invention may further include the step of recovering an optical characteristic based on the results of iterative analysis of an image and utilizing the recovered optical characteristic in further analyzing the image or in analyzing similar images. As used herein the term "recovered optical characteristic" or "recovered parameter" refers to an optical characteristic or data value associated with a specific parameter determined through iterative analysis. The recovered optical characteristic may be associated with any parameter, including, but not limited to, brightness, color, location, orientation, reflectivity or combinations thereof. Additionally, in certain embodiments, the recovered parameters may encompass a probability of recovering a parameter using iterative analysis or uncertainties regarding a parameter or uncertainties regarding any aspect of a recovered parameter. In such embodiments, a recovered optical characteristic may be determined to be significantly different than the initially measured data value for a parameter associated with the optical characteristic for all or a portion of the image under study, and the data value for the recovered parameter may be used to adjust this parameter in other portions of the image under study and/or different subsequent images of the same or a similar area. For example, the brightness of a portion of an image may be determined through iterative analysis to be significantly lower than the brightness value initially measured due to, for example, a reflection. The data value for the recovered brightness may then be used to adjust the brightness in other portions of the image thereby reducing the effect of the reflection throughout the image allowing a source of the brightness to be revealed.

In various embodiments, the method described hereinabove may be automated. For example, in some embodiments, the steps for successive rounds of iterative image analysis may be automated, and in several embodiments, the automated steps may include determining if additional objects are present in the real image. For example, in some embodiments, a rules-based system may be used for determining when iterative rounds of inserting artificial objects or removing real objects from one or more images have been carried out an adequate number of times to achieve the desired result, such as, reducing the uncertainty of a number of parameters a sufficient amount. In at least one embodiment, such a rules-based system may include a statistical framework to evaluate a degree of statistical confidence that an unidentified object is present in an image or a portion of an image. Without wishing to be bound by theory, by developing a rules-based system for determining the number of successive iterations that are adequate, the majority of work may proceed automatically at computational speeds until a final desired result has been achieved and the amount of human interaction required for the decision making process of on-going evaluations may be reduced thereby reducing the total time required to achieve the desired result.

As described above, some embodiments of the invention may include the generation of a report detailing the results of iterative analysis of the image (See, for example, FIG. 1, 15.1, FIG. 2, 15.2 or FIG. 3, 15.3). The parameters reported in the report may vary among embodiments of the invention and may include any number of observed, measured, calculated or statistically-derived (for example, average, median, etc.) parameters. Additionally, the report may contain results associated with statistical analysis of the results of iterative analysis and may reflect the completeness of analysis of the image. For example, in one exemplary embodiment, the report may simply provide the location and orientation of all the identified objects in the image understudy and a measure of completeness of analysis, for example, the analysis is 95% complete indicating that there is a 5% likelihood that additional unobserved objects are present in the image. In another exemplary embodiment, the report generated may contain an initial number of objects identified, an estimate of a number of objects identified through iterative analysis, the average of the identified objects and unidentified objects, the error associated with this average number of objects, and the confidence level that the iterative analysis of the real image has been carried out a sufficient number of times. In another example, it may be concluded that if an object were present in a real image, it would have been detected, for example, 95% of the time. In another embodiment, the report may contain averages for any or all of the parameters measured during iterative analysis for the entire image or any portion of the image. For example, an average brightness, contrast, color, orientation, or location for an object may be reported along with errors associated with each real or modified image and an overall confidence level for the average measurements. As used herein, the term "confidence level" may, generally, refer to the degree of error associated with the iterative analysis or a data value determined as a result of such analysis. For example, a "confidence level" for a particular parameter's uncertainty may be reported as 0.005%+/−0.001% indicating that the "uncertainty in the uncertainty" has been measured fairly precisely. In yet another embodiment, information obtained using methods embodied herein may be used to determine the 3-sigma upper limit (3-standard deviation limit) to how many people might be present but unseen given a detected group of a certain size. For example, an estimated population of an area may be ascertained by analysis of a number of vehicles, a size of various buildings within the field of view, and so on.

Conclusions such as those provided by iterative analysis may provide additional information regarding the likelihood of objects being present in an image which may provide a greater degree of confidence in decision making. For example, in one embodiment the information extracted via the techniques embodied herein may allow for an increase in actionable intelligence and real-time assessment of the probability of detection for a set of objects of interest. In a further embodiment, analyses provided by the methods embodied by the invention may be applied in the acquisition and analysis of specific targets. Additionally, the conclusions reached by iterative analysis may be used to automate the analysis of other images or to prioritize or triage similar images and to provide an estimate of the completeness of analysis of other images. Without wishing to be bound by theory, information obtained from analysis of images that have been compiled, may be utilized to improve consistency of analysis over a broader range of images.

The report may be in any format known in the art and may be provided on any medium. For example, a report may be formatted as a list or spreadsheet and may be provided on any medium, including, but not limited to, paper, computer monitor, a digital recording device, or any combination thereof.

The images utilized in the methods described herein may be from any source. For example, in some embodiments, images utilized may be derived from an analog or digital camera or image detector and the images may be still images or video images or if more than one images are utilized in object analysis the various images may be acquired from a combination of still or video images. In other embodiments, the images utilized in methods of the invention may be non-optical in nature. For example, the images may be derived from an infrared (IR) sensor or detector, an ultraviolet (UV) sensor or detector, radar sensor or detector, synthetic aperture radar (SAR) sensor or detector, sonar sensor or detector and the like, or a combination thereof. The camera, image detector, or non-optical detector of various embodiments may be fixed or movable, for example, an image detector or IR detector may be handheld, mounted on a building or mounted on a motorized vehicle such as, for example, a car, truck, tank, boat, ship, airplane, spaceship or a satellite. In still other embodiments, the detector may be mounted on a device, such as, for example, telescope or magnifying or telephoto device. As used herein the term "detector" may refer to an optical image detector or camera, or a non-optical sensor or detector, such as, but not limited to an IR or UV, radar, SAR and sonar sensors or detectors.

Any image may be analyzed using the method of the invention. As used herein, the term "image" shall refer to an image acquired from an optical imager, such as, a camera or image detector, or a non-optical image acquired from, for example, a IR detector or radar. For example, in some embodiments, an image may include complex, crowded fields, such as extraterrestrial images of stars and/or planets acquired from a telescope, terrestrial images acquired from satellites, a fixed or movable detector or a handheld device including a large number of objects. The images of embodiments may be of an area whose size may vary depending on the range and capability of the detector used and may encompass a terrestrial area, an aquatic area, an extraterrestrial area or any combination thereof. In various embodiments, images may be a still or video image encompassing aerial images, satellite, ground to ground images, ground to air images, ground to water images, water to ground images, water to water images, air to air images, or a combinations of these. For example, an aerial image acquired from a detector mounted on a satellite or airplane may encompass a large terrestrial area with a portion of the image including an aquatic area, such as, a portion of a lake, ocean, river, pond, pool, marsh, swamp, or combination thereof. In another example, the ground to ground image acquired from a detector mounted on a truck and may encompass a large terrestrial area with a portion of the image including an extraterrestrial area, such as the sky. In yet another example, a water to water image acquired from an detector mounted on a ship may encompass a large aquatic area with a portion of the image sky and/or ground.

Images acquired may include any number of observable objects, such as, for example, buildings, structures, trees, plants, geological formations, aquatic features, aerial features, extraterrestrial features, vehicles, such as, cars, trucks, tanks, boats, ships, airplanes, military implements, artillery installations, animals, humans, or combinations thereof, and any of the preceding objects may be wholly or partially covered or hidden in the acquired images. In some embodiments, the specific type of object may be determined. For example, a type of building, such as, a storage building, barracks, power plant or type of plant or a type of vehicle, such as, the type of airplane, type of car or truck, type of ship, etc. may be determined from a real image. The images acquired in various embodiments may also contain any number of unobservable or hidden objects, and such unobservable or hidden objects may be the same or different from the observable objects.

The method of some embodiments of the invention may further include the step of enhancing the one or more images. Enhancing may include any number or combination of steps for the purpose of making the image as a whole or one or more objects in the image more clearly visible. For example, enhancing may include the steps of performing geometric transformations, such as, enlarging, reducing, or rotating the image or a portion of the image; adjusting the color of the image by, for example, adjusting brightness and contrast, quantizing the image, histogram matching or converting to a different color space, such as, for example, gray scaling; registering or aligning two or more images; combining or splicing of two or more images using, for example, averaging, sigma clip averaging, registering, median-filtered combining, coadding, blending, differencing, or creating a composite image; collaging; convolution or deconvolution filtering; unsharp masking; edge detecting; performing a Fourier transformation; reducing background noise; texturing; mosaicing; interpolating; demosaicing, and/or recovering a full image from a raw image data or format; segmenting the image into regions, editing or retouching the image; extending the dynamic range of an image by combining images taken under different exposures; restoring an image by, for example, deconvoluting to reduce blur, restoring of faded color, removing of scratches; and any combination thereof.

In certain embodiments, images from different bands may be combined. For example, in one embodiment, an optical image may be aligned, combined, averaged, blended and so forth with a non-optical image, such as, an IR image (combined optical and IR data are referred to as OIR) to produce what may be referred to as multispectral data. In another embodiment, radically different bands from different sensors or detectors may be combined in a process referred to as sensor fusion to produce hyperspectral data. For example, hyperspectral data may be derived by combining optical and SAR images and SAR and OIR data. In embodiments using multispectral or hyperspectral data, one or more iterations may include the step of acquiring data from more than one band, for example, optical and IR or SAR data.

The methods of various embodiments of the invention may include any number of enhancing steps and enhancing steps may occur at any point throughout the analysis process described herein. Additionally, all of the image or only a portion of the image may be enhanced during any enhancing step. For example, a terrestrial image acquired from a satellite may be enhanced by reducing background noise, adjusting the brightness and contrast, and performing edge detection for the entire image. The image may then be analyzed and a portion of the image may be enhanced by enlarging an area of the image containing, for example, a structure and deconvoluting that portion of the image. Analysis may continue and a separate area of the original image may be enhanced to distinguish a previously unobserved structure.

Some embodiments of the invention may additionally include the step of digitizing the acquired images. Digitizing generally refers to the process of converting an image into a digital or computer readable and computer manipulatable format. The step of digitizing is not limited to any specific method or mode of digitizing an image and may occur by any means known in the art. For example, in one embodiment, an acquired image is digitized automatically. Many digitizing software packages are known and used in the art. Any of these may be used to digitize the acquired images of various embodiments of the invention. In another embodiment, digitizing occurs manually wherein a user uses a graphical interface, a cursor and a digitizing table to generate a digitized version of the image.

Each analyzing step may be carried out by any method known in the art. For example, in one embodiment, the first analyzing step may be accomplished by a human user who visually detects and reports one or more objects in a real image. For example, the user may locate observable objects, such as, buildings, vehicles, humans, and the like, and provide a location for these objects in a digital grid which is utilized in an automated process. In another embodiment, Automatic Target Recognition (ATR) software is used to detect objects in an image. Briefly, in such embodiments, the acquired image and modified images may be digitized and divided into a plurality of image chips each image chip including a portion of the acquired image. The image chips may then be parsed into chips having a high probability of containing objects or portions of objects and chips having a low probability of containing an object. In still other embodiments, a real image may be divided into a plurality of image chips and each of the image chips may be individually analyzed using the iterative method of the invention. In yet other embodiments, a real image may be divided into a plurality of image chips and only those image chips having a high probability of containing objects may be analyzed using the iterative analysis of the invention, and in further embodiments, iterative analysis may be performed on a region of an image where the greatest level of parameter precision is required. Similarly, parameters may be adjusted for individual image chips or for the acquired or modified image as a whole. In embodiments wherein image chips are processed individually, the acquired image may be reconstructed following analysis of each iteration, or the image may be reconstructed at the completion of a complete iterative analysis. In some embodiments, astronomical algorithms may be utilized to assess terrestrial images because the low signal-to-noise ratio hyperspectral data of unresolved celestial targets exactly minors the low signal-to-noise ratio hyperspectral data of unresolved terrestrial data provided by satellites.

The step of inserting artificial objects into the real image may be carried out using any method known in the art or available to the user, for example X-Patch, Paint-The-Night (PTN) and Night Vision and Electronics Sensors Directorate Electro-optics Simulation Toolkit (NVEOST). Additionally, several software packages have been recently developed to insert artificial stars into a astronomical image including, but not limited to IRAF and SPS. While these packages were not designed specifically for use with terrestrial images, they may be useful in iterative analysis of terrestrial images or may be modified to successfully prepare a package for analysis of terrestrial images. Additionally, these or similar packages may be modified to assess the confidence limits for a real image, given the results of iterative analysis. For example, it may be efficient to use a routine similar to PTN or NVEOST to embed an image chip of an artificial object into a real image in order to make the most accurate hyper-spectral model of, for example, a tank under sand, netting, and/or trees. It should be noted, the insertion of artificial objects into a real image is meant to probe the image and not just to create a new image.

The artificial objects inserted into an image may be derived from any source. For example, in some embodiments, the artificial object inserted into an image may be derived from a library of stock or archived objects of interest. For example, artificial objects inserted into a terrestrial image of a military encampment may include, but not be limited to, vehicles, such as, trucks, tanks, missile launchers, aircraft, motorcycles, boats, ships and the like; buildings, such as, houses, barracks, garages, storage buildings, weapons depots, and the like; people; armaments, such as, anti-aircraft artillery, missiles, and so on. In some embodiments, artificial objects from a library that are inserted into an image may be roughly defined including only an outline of an object or a simple geometric shape having a color or contrast. In other embodiments, the artificial objects may be extremely well defined in near-analytical terms, including, for example, a well defined geometry, albedo, spectroscopic properties, polarimetric properties, and the like. In such embodiments, a caveat to the three-dimensional library object may be the insertion geometry versus the image acquisition geometry. However, this transformation is well known in the art and routine to the skilled artisan.

In another embodiment, the artificial objects inserted into an image may be based on real objects observed in the real image. For example, a vehicle observed in the real image may be used to probe the image for additional, unobserved vehicles in the image. In such embodiments, a signature associated with the identified object may be extracted from the data derived from the initial analysis of the real image, and this signature may be used to probe the image for additional, unobserved objects. In another embodiment, the signature of a portion of an identified object may be used to probe an image where the only examples of an observed object available are at least partially obscured. In yet another embodiment, the signature of an at least partially obscured object may be used to assess detectability of other at least partially obscured objects, and this assessment may be used to evaluate the likelihood of additional objects being present but at least partially obscured. The extraction of an observed object may be accomplished by any method known in the art. For example, extraction of an object may be based upon an area selection tool which may be manual or automatic. Additionally, the selection tool may additionally include an optional "auto-grow" tool wherein partially obscured objects with clearly identifiable edges are compared to archived objects and edge lines are added to complete the object. In still another embodiment, an object may be fabricated in a real image at a position where an unobserved object is known to exist or a portion of the image having a high likelihood of an unobserved object being present. In yet another embodiment, image analysts may be used to build a library based on object extracted from real images.

Artificial objects selected from a library or based on an identified object may be additionally manipulated by, for example, rotating, scaling, shearing, smearing, or otherwise degrading the artificial object such that the object is consistent within the context of the real image. For example, in some embodiment, artificial objects may additionally include shadows, obscuration, layover, multipath, indirect illuminations, and reduced/partial transparency effects thereby allowing the artificial object to appear more realistic in the environment of the image, and in one embodiment, these aspects of the artificial object may be altered or adjusted based on, for example, the time period in which the image was acquired. For example, the shadow associated with an artificial object may be adjusted based on whether a terrestrial image was acquired in the morning, afternoon, evening or at night. In at least one embodiment, illumination angles and shadow properties may be generated from ambient features of the real image, such as, ground-plane, trees, buildings, etc. which may be used to add realistic shadows to artificial objects. In another embodiment, an artificial object may be rotated, sheared, smeared, convoluted, degraded, or scaled to fit within the context of an image and corresponding shadows may be added to the artificial object to fit the time frame in which the image was acquired. In yet another embodiment, an artificial object may be obscured by adding, for example, a known camouflage pattern, simulated netting, simulated vegetation, simulated ground covering, simulated water covering, simulated cloud covering, simulated weather, convolving with a nearby object or combinations thereof. Thus, a partially obscured object may also be simulated. In still another embodiment, a ray-tracing or a ray-casting code-base may be utilized to insert artificial objects. For example, a computer program, such as, the open source POV package, may be used to define the ground-plane (or planes) with contextual clicks and foreground object categories (trees, buildings, etc.) that can obscure the artificial object. The transparency, seeing, signal to noise ratio, and so on may also be selected using this approach.

In yet another embodiment, the process for inserting artificial objects may include a noise module wherein shot-noise, detector noise, and degradation due to optics and atmospheric effects may be added to the artificial object. In addition, other noise components may be added to the noise module, such as, but not limited to, diffuse reflection or blending from nearby objects and light sources. Noise may be applied to an artificial object when or where the artificial object is inserted into the image and the noise may become part of the signature in that artificial object. The specific approach for adding noise may depend upon whether an archived object from a library or a recovered/extracted object from a real image is inserted or reinserted in a different place. In embodiments wherein recovered real objects are reinserted into an image, some parts of the noise model may not be reapplied, for example, PSF degradation and/or detector noise may not be applied, although shot noise may have to be modified due to illumination and/or scaling. In either instance, reflection effects can be important considerations. In such embodiments, transparency, atmospheric variables, noise and the like may be resolved by comparison to observable objects in the real image, such as a static buildings, land features, etc.

In various embodiments objects identified by iterative analysis may require some degree of human characterization. For example, in one embodiment, the method of the invention may include the step of comparing an identified object to various objects in a library to determine the type of object identified. In another embodiment, an auxiliary procedure may be provided to estimate key geometric properties of the identified object. For example, the observed geometry of an identified object and it's viewing parameters, such as, for example, altitude, azimuth, pixel-scale and observed instrumental target dimensions may provide quantitative information which may be used to identify an unobstructed object from a library of objects.

The method of embodiments described herein are not limited by the apparatuses used for their implementation. For example, in one embodiment, the method may be encoded by an algorithm or computer program in computer readable form. Such an algorithm or computer program may be encoded onto any information storage device known in the art, including, but not limited to, a computer readable disk, a CD, a DVD, a hard drive, a flash drive, an optical drive, a zip disk and a tape. The algorithm or computer program may be utilized by any machine capable of decoding and implicating the algorithm or computer program for the analysis of an image. Such machines include, but are not limited to, computers, computer processors, image processors and so on.

The invention described herein further includes systems for implementing the method and embodiments of the invention are not limited by the type of system utilized. For example, in one embodiment, the system may include a detector for acquiring real images, a processor for digitizing the real image in communication with the detector, a processor for analyzing the real image in communication with the processor for digitizing the image, a processor for creating modified images by inserting artificial objects into the image in communication with the processor for analyzing the image, a processor for analyzing the modified image in communication with the processor for creating modified images, a processor for comparing the results of analysis of the real image and the modified image in communication with the processor for analyzing the real image and the processor for analyzing the modified image, a processor for determining whether enough iterations have occurred in communication with the processor for comparing and the processor for creating modified images, a device for generating a report in communication with the processor for determining whether enough iterations have occurred, and an output device. The type of processors utilized in such systems may vary among embodiments and may be mechanical devices, such as, computer processors, image processors, and so on or the processors may be one or more humans. In some embodiments, each of the processors described above may be a single processor performing the steps of the methods of the invention in an order such that iterative analysis may be accomplished. In other embodiments, a computer processor may complete a number of steps in the method, and a human processor may perform other steps in the process. In still other embodiments, a computer processor may be capable of completing each step in the processor, but a human may intervene by performing any number of steps in combination with the computer processor or in place of the computer processor.

This invention and embodiments illustrating the method and materials used may be further understood by reference to the following non-limiting examples.

EXAMPLE 1

Figure 4:
FIG. 4 shows a digital satellite terrestrial image of an area including several objects.
Figure 5:
FIG. 5 shows the digital satellite terrestrial image of FIG. 4 having seven artificial objects inserted into the image at various locations.

FIG. 4 is a DigitalGlobe satellite image of a facility including a large building at the center, probable vehicles to the right of the building and an object to the left of the building (circled). Initial analysis of the image concludes that the object to the left of the building is an emplacement of an anti-aircraft artillery (AAA) battery. To assess the likelihood of additional unobserved AAA emplacements being present in the image, additional objects having similar visual properties to the identified AAA emplacement have been added to FIG. 5. In FIG. 5, seven instances of the AAA emplacement noted in the previous figure have been added (circled). Subsequent reanalysis of the image of FIG. 5 may, for example, recover six instances of this particular object of interest. After repeating 100 iterations of similar analysis, it may be concluded that one would expect to observe 85% of such AAA emplacements based upon repeated reanalysis over the full terrain covered in the images field of view. The number of repeat experiments may also determine the confidence level of the analysis, with more experiments producing greater certainty, at the cost of time and computational resources. Of course, in a real example, the background would be matched and the correct noise model would be employed, using, for example, Paint-the-Night, NVEOST or X-Patch. While numerous subtleties exist, this example provides the conceptual framework for the methods of the invention.

EXAMPLE 2

To demonstrate the automated approach to the problem of completeness and uncertainty estimation, Artificial Star Simulation and Modeling Tool (ArtStar) toolkit on a set of 31 frames of the field of the X-ray binary GRO J1655-40 in the Galactic plane was tested using iterative image analysis. Real images are provided in FIG. 6 and FIG. 7. In these images, the field of view is mildly crowded, and the major limitation on the completeness is the resolution of the objects (stars), the brightness of the background, and the degree of cloudiness during acquisition of the images.

Figure 6:
FIG. 6 shows an exemplary extraterrestrial image illustrating "good" data.
Figure 7:
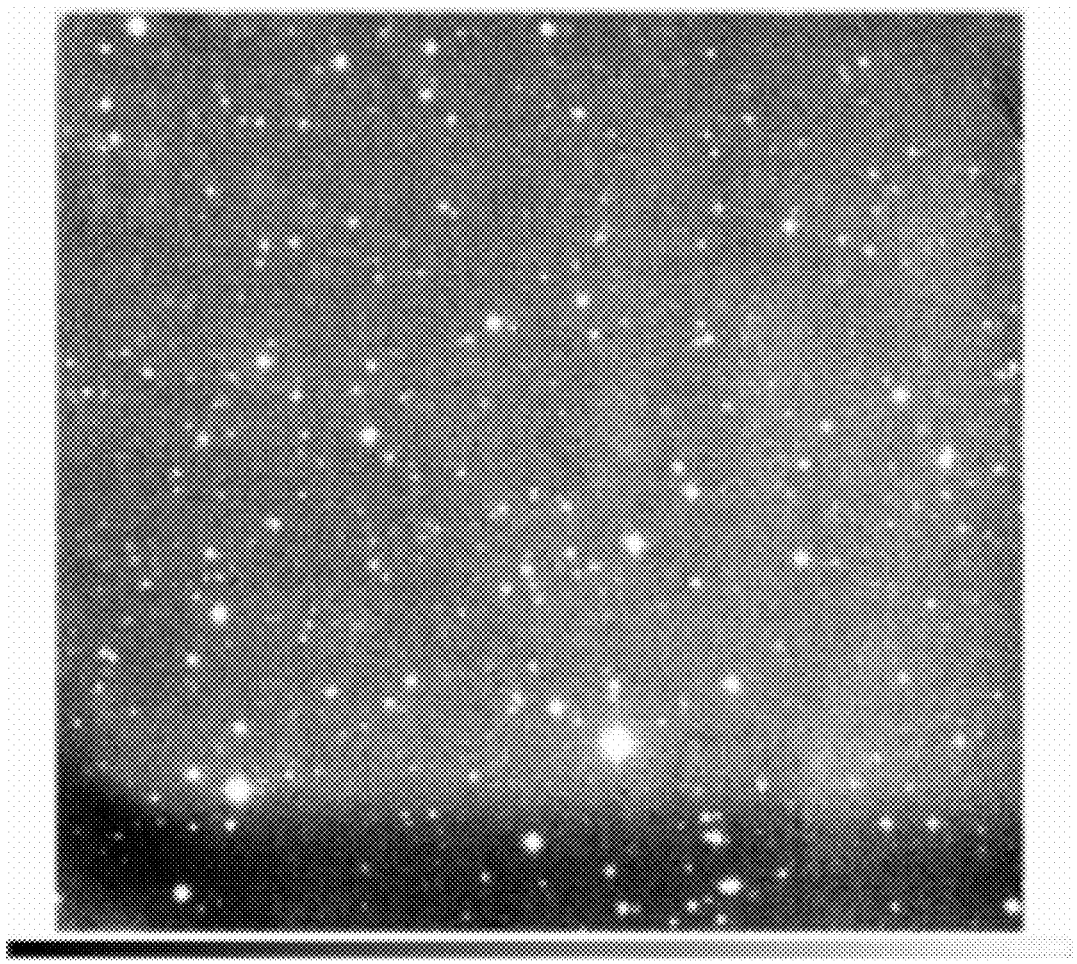
FIG. 7 shows an exemplary extraterrestrial image illustrating "bad" data.

FIG. 6 is an example image collected of X-ray binary GRO J1655-40, located in the Galactic disk and represents "good" data. Although this image is of high quality, the level of crowding is significant due to the very high density of stars in the image. The stars in this image look bigger than those in FIG. 7 only because of the display contrast used. FIG. 7 is another example image of GRO J1655-40 and represents "bad", cloudy data. This exposure is a lower quality image with signal-to-noise being lower and image resolution being worse. It should be noted that the ability to see faint objects in the "bad" image (FIG. 7) is significantly curtailed compared to the "good" data (FIG. 6). While this qualitative statement is intuitively obvious, using methods of the invention it may be possible to quantify how much better one image is over another.

Figure 8:
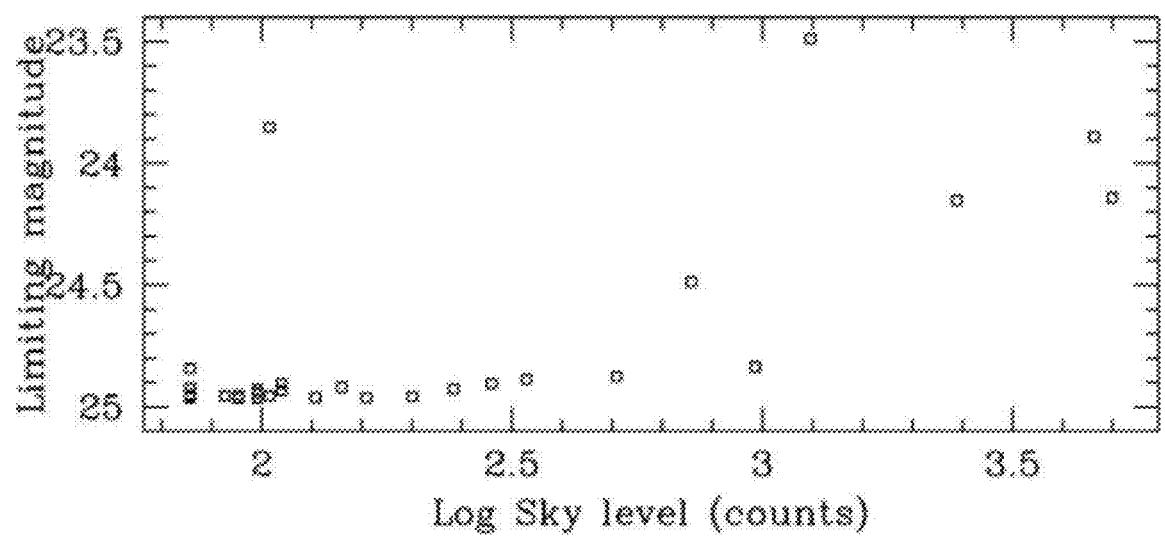
FIG. 8 shows a plot of the limiting magnitude of an extraterrestrial image versus the log of background brightness.

FIG. 8 is a plot showing that as the sky brightness level increases, only progressively brighter stars are visible. In a terrestrial application, this example might correspond either to a succession of images at different light levels or successive images effected by weather. FIG. 8 shows that the faintest detectable objects, "limiting magnitude", for each frame as a function of the logarithm of the brightness of the background. "Magnitude" as used herein is a unit of brightness commonly used in astronomy; larger magnitudes correspond to fainter objects. The limiting magnitude of the data provided has been estimated as having a completeness of approximately 50%. Since larger magnitudes indicate fainter stars, the frames that measure the faintest stars are the ones with the highest limiting magnitude. The mean value of the group at the bottom is 24.93 with a standard deviation of 0.04 magnitudes, better than the targeted error of 0.05.

Figure 9:
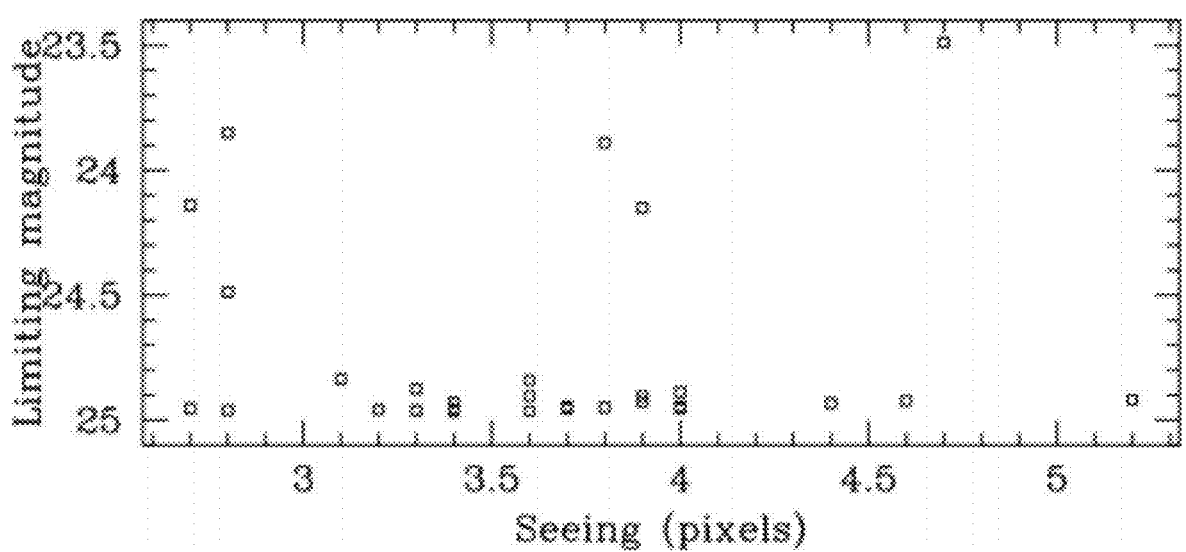
FIG. 9 shows a plot of the limiting magnitude of an extraterrestrial image versus seeing.

FIG. 9 shows a plot of the same limiting magnitude versus the seeing. The limiting magnitude shows little dependence on the seeing, but shows a stronger dependence on the level of background noise. For example, frames affected by moonlight have brighter limiting magnitudes than the balance. The outliers with poor limiting magnitude are, therefore, the result of clouds, which reduce the signal to noise ratio of images with constant exposure time. Additionally, the plot of FIG. 9 demonstrates that as atmospheric blurring increases, only progressively brighter stars are visible. Just as atmospheric conditions can reduce the resolution of astronomical images, they can degrade terrestrial images taken through turbulent air. Since image resolution can be a key parameter for detecting objects of interest, this type of assessment can be a critical tool to help triage the masses of unmanaged imagery data that arrives hourly.

Taken together, the data provided in FIG. 8 and FIG. 9 enable the choice of which images are the most useful. Acquiring similar sets of data for terrestrial images using the methods of the invention may enable quantitative analysis of how reliable acquired image data are and how faint, small or obscured an object can be and still be detectable.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:
1. A method for detecting an object in an image comprising:
    defining a known data set, said known data set comprising one or more parameters describing a real image;
    creating a modified image by inserting at least one object into the real image;

defining an unknown data set, said unknown data set comprising one or more parameters describing the modified image;

repeating the steps of creating a modified image to create one or more modified image and defining unknown data sets to create one or more unknown data set;

performing an operation comprising averaging, median-filter combining, adjusting contrast, adjusting color, image extraction, collaging, registering, coadding, sigma-clip averaging, splicing, histogram matching, mosaicking, convolution filtering, deconvolution filtering, unsharp-masking, edge detection, Fourier transformation, reducing background noise, texture processing, creating multispectral data, using multispectral data, creating hyperspectral data, using hyperspectral data, or combinations thereof on the plurality of unknown data sets to create a final unknown data set;

comparing the known data set and the final unknown data set; and identifying parameters that were altered as a result of the insertion of the at least one object in the modified image.

2. The method of claim 1, further comprising identifying areas within the real image where additional, unidentified objects may be present based on the altered parameters.

3. The method of claim 1, wherein the one or more parameters each comprise one or more data values comprising a number of objects in the image, brightness, contrast, color, shape, orientation, or location of objects in the real image or any portion thereof, the modified image or any portion thereof, or combinations thereof.

4. The method of claim 1, further comprising determining the uncertainty associated with a parameter by comparing parameters determined for a real image with a modified image.

5. The method of claim 1, further comprising minimizing uncertainty associated with a parameter by a method comprising comparing data values for each parameter of the plurality of unknown data sets.

6. The method of claim 1, further comprising reevaluating the real image by comparing the known data set with the final unknown data set.

7. The method of claim 1, further comprising identifying a portion of an image having a higher likelihood of containing a previously unidentified object.

8. The method of claim 7, further comprising:
isolating the portion of the image having a higher likelihood of containing a previously unidentified object; and
analyzing the portion of the image by the method of claim 1.

9. The method of claim 1, further comprising;
recovering an optical, radar, ultraviolet, infrared, microwave, or combination thereof characteristic; and
adjusting the real image or any modified images based on the recovered optical, radar, ultraviolet, infrared, microwave, or combination thereof characteristic; and
analyzing the real image or modified image after applying the recovered optical, radar, ultraviolet, infrared, microwave, or combination thereof characteristic.

10. The method of claim 1, further comprising performing Monte Carlo simulation.

11. The method of claim 1, further comprising repeating each of the steps of claim 1.

12. A method for detecting an object in an image comprising:
defining a known data set, said known data set comprising one or more parameters describing a real image;
creating a modified image by removing at least one object from the real image;
defining an unknown data set, said unknown data set comprising one or more parameters describing the modified image;
repeating the steps of creating one or more modified image and defining an unknown data set to create a plurality of unknown data sets;
performing an operation comprising averaging, median-filter combining, adjusting contrast, adjusting color, image extraction, collaging, registering, coadding, sigma-clip averaging, splicing, histogram matching, mosaicking, convolution filtering, deconvolution filtering, unsharp-masking, edge detection, Fourier transformation, reducing background noise, texture processing, creating multispectral data, using multispectral data, creating hyperspectral data, using hyperspectral data, or combinations thereof on the plurality of unknown data sets to create a final unknown data set;
comparing the known data set and the final unknown data set; and
identifying parameters that were altered as a result of the removal of an object from the modified image.

13. The method of claim 12, further comprising identifying areas within the real image where additional, unidentified objects may be present based on the altered parameters.

14. The method of claim 12, wherein the one or more parameters each comprise one or more data values comprising a number of objects in the image, brightness, contrast, color, shape, orientation, or location of objects in the real image or any portion thereof, the modified image or any portion thereof, or combinations thereof.

15. The method of claim 12, further comprising determining the uncertainty associated with a parameter by comparing parameters determined for a real image with a modified image.

16. The method of 12, further comprising minimizing uncertainty associated with a parameter by a method comprising comparing data values for each parameter of the plurality of unknown data sets.

17. The method of claim 12, further comprising reevaluating the real image by comparing the known data set with the final unknown data set.

18. The method of claim 12, further comprising identifying a portion of an image having a higher likelihood of containing a previously unidentified object.

19. The method of claim 18, further comprising:
isolating the portion of the image having a higher likelihood of containing a previously unidentified object; and
analyzing the portion of the image by the method of claim 12.

20. The method of claim 12, further comprising;
recovering an optical, radar, ultraviolet, infrared, microwave, or combination thereof characteristic; and
adjusting the real image or any modified images based on the recovered optical, radar, ultraviolet, infrared, microwave, or combination thereof characteristic; and
analyzing the real image or modified image after applying the recovered optical, radar, ultraviolet, infrared, microwave, or combination thereof characteristic.

21. The method of claim 12, further comprising performing Monte Carlo simulation.

22. The method of claim 12, further comprising repeating each of the steps of claim 12.

* * * * *